United States Patent [19]

Rockstead et al.

[11] 3,844,173

[45] Oct. 29, 1974

[54] METHOD AND APPARATUS FOR MEASURING PRESSURES IN FLUID LINES

[75] Inventors: Raymond H. Rockstead, Livermore; Richard T. Hasbrouck, Danville, both of Calif.

[73] Assignee: The United States of America as represented by the United States Atomic Energy Commission

[22] Filed: Apr. 19, 1973

[21] Appl. No.: 352,812

[52] U.S. Cl. ............................. 73/398 R, 73/393
[51] Int. Cl. ................................. G01l 9/10
[58] Field of Search...... 73/398 R, 393, 388 R, 418, 73/389, 409, 406, 432 R

[56] References Cited
UNITED STATES PATENTS

3,254,536   6/1966   Brown.................................. 73/393
3,289,479   12/1966  Tausch............................. 73/398 R Primary Examiner—Donald O. Woodiel
Attorney, Agent, or Firm—John A. Horan; Frederick A. Robertson; L. E. Carnahan

[57] ABSTRACT

A method and apparatus for measuring static and dynamic pressure in fluid lines by monitoring the linear elongation of the lines which is a function of the fluid pressure therein. For example, the elongation is measured with a linear variable differential transformer, the core of the transformer being mounted on the line being measured, with signal conditioning electronics used to provide a high level output voltage proportional to tube elongation. In this approach, one simply accrues enough length on the tube being measured to obtain a ΔL that the apparatus can use for practical signal to noise ratio output, and the ΔL/L ratio is of secondary importance.

15 Claims, 12 Drawing Figures

METHOD AND APPARATUS FOR MEASURING PRESSURES IN FLUID LINES

BACKGROUND OF THE INVENTION

The invention described herein was made in the course of, or under, Contract No. W-7405-ENG-48 with the United States Atomic Energy Commission.

Various prior art methods have been developed for measuring high gas pressures in lines and vessels. Most prior art pressure transducers incorporate a force collecting diaphragm (sensor) in direct contact with the pressure medium. This diaphragm is deformed in proportion to the applied pressure and the resulting strain or displacement is measured using one of several mechanical-to-electrical signal transducer devices. Generally the diaphragm is located at the end of a dead-volume formed by the transducer body. This produces a void which adds a small amount of volume to the system and within which unwanted trapping of material occurs. Although the "flush diaphragm" sensor eliminates this dead-volume, both types of diaphragm transducers require that the system be broken into and both present the pressure medium with a foreign component, the diaphragm.

Also, prior art pressure measuring devices have utilized the effect of high pressure to straighten a double loop in a fill line, similar to conventional high pressure gauges. However, in cases where the pressures are dangerously high, i.e., in multi-K psi region, and/or where the gas is toxic, it is not desirable to tap, bend, or modify a gas line to be able to determine the pressure. Thus a need has existed in the prior art for a simple, yet effective, method for accurately measuring high gas pressures. Prior art systems, utilizing a strain gauge for instance, have also attempted to measure elongation but have failed due to an adverse signal to noise ratio. This is necessarily due to the fact that the measureand $\Delta L/L$ ratio (in the tubing) is not a great deal different from the transducing $\Delta R/R$ ratio (gauge factor).

SUMMARY OF THE INVENTION

The inventive pressure measuring method and apparatus provides a solution to the above-mentioned problem by a simple yet accurate approach to the measurement of high pressure fluids in lines and/or vessels. The invention is based on the recognition that fluid lines elongate somewhat under the influence of high internal pressures. The pressure measuring system of the invention monitors the elongation, and the elongation signal is then translated into a pressure reading. In the inventive apparatus, it is only necessary to simply accrue enough length to obtain a $\Delta L$ that the apparatus can use for practical signal to noise ratio output, and the $\Delta L/L$ ratio of the prior art systems is of secondary importance in the design. It can therefore be seen that "gauge factor" is no longer a limiting criteria in this system. In addition, the invention can be used for monitoring pressures in closed vessels or large diameter pipes. The very large diameter pipes may also be monitored by using the system to monitor elongation of a hoop strain collector, comprising a coil of wire or other suitable material wrapped around the periphery of the pressure vessel or pipe. The inventive apparatus cannot trap unwanted material since the pressure medium enters at one end and exits, unrestricted, at the other.

The inventive pressure measuring system has the following advantages:

1. Automatically temperature compensated by using a metal with the same coefficient of thermal expansion for the portions of the apparatus as in the line being measured.
2. Takes very little space.
3. No welding or other deformation of the line is required.
4. Causes no voids or dead volume areas in the line.
5. The pressure ranges can be varied by changing inside diameter, wall thickness, and/or tubing material, for instance.
6. Can sustain very high over-pressures without deformation or damage.

Therefore, it is an object of this invention to provide a method and apparatus for measuring pressures in fluid lines and vessels.

A further object of the invention is to provide a method and apparatus for measuring the pressure in fluid lines by monitoring the linear elongation of the lines as a function of the fluid pressure therein.

Another object of the invention is to provide a method and apparatus capable of simply and accurately measuring high pressures in fluid lines or closed vessels.

Another object of the invention is to provide a method and apparatus for accurately measuring high pressures in fluid lines based on the elongation of the lines under the influence of high internal pressures.

Another object of the invention is to provide a method and apparatus for measuring high pressures in fluid lines by monitoring the elongation of the lines and translating the elongation signal into a pressure reading.

Other objects of the invention will become readily apparent from the following description and accompanying drawings.

DESCRIPTION OF THE INVENTION

The present invention provides a method and apparatus for accurately measuring high gas or other fluid pressures, either dynamic or static. The use of the invention is particularly advantageous in situations where the high pressure is confined in a pressure vessel having high pressure lines connected to it. For example, in cases where the pressures are dangerously high, i.e., in multi-K psi region, and/or where the gas is toxic, it is not desirable to tap or modify the high pressure system to be able to determine the pressure. Also, the invention may be used as a gauge with a linear dead end fluid line which communicates with a pressure vessel interior, or in monitoring pressures in closed vessels or large diameter pipes. Thus, the invention permits the accurate measurement of high static and dynamic pressures and introduces no foreign materials into the pressure medium.

The inventive pressure measuring system is a simple approach based on the recognition that the fluid lines elongate somewhat under the influence of high internal fluid pressures. The pressure measuring method and apparatus monitors the elongation, and this elongation signal is then translated into a pressure reading. The pressure sensor is of the same tubing as the remainder of the pressure system and thus the pressure medium enters and exits unrestricted.

The inventive pressure measuring apparatus makes use of a physical characteristic of the fluid system being measured; namely, the linear elongation of tubing in the presence of an applied pressure. If the input end of a piece of tubing is held fixed while the other end is allowed to be free, it is possible to use one of several non-contacting linear displacement transducers to measure the motion. The embodiments of the apparatus, hereinafter described, utilize a linear-variable-differential-transformer (LVDT) as the transducer. The ferromagnetic core of the transformer is secured on the tubing and the companion transformer coil is held fixed, its windings surrounding the core and tubing. The LVDT is connected to signal conditioning electronics which transform a physical elongation into an electrical analog of applied pressure.

In this LVDT approach, one simply accrues enough length to obtain a $\Delta L$ that the LVDT can use for practical signal to noise ratio output, and the $\Delta L/L$ ratio is of secondary importance in the design. It can be seen that "gauge factor" is no longer a limiting criteria in this system.

Intrinsic temperature compensation is achieved by mounting the transformer assembly within a block of material having the same coefficient of thermal expansion as the tubing. The tubing is fixed, at its input end, to the block and passes through the block and LVDT. Because of differences in coefficients of expansion of the several materials making up the transducer, a housing or sleeve of aluminum or other suitable material is used as an adjustable interface between the outer block and the transformer. This results in a fully adjustable, mechanical temperature compensation of the mechanical assembly.

Figure 1:
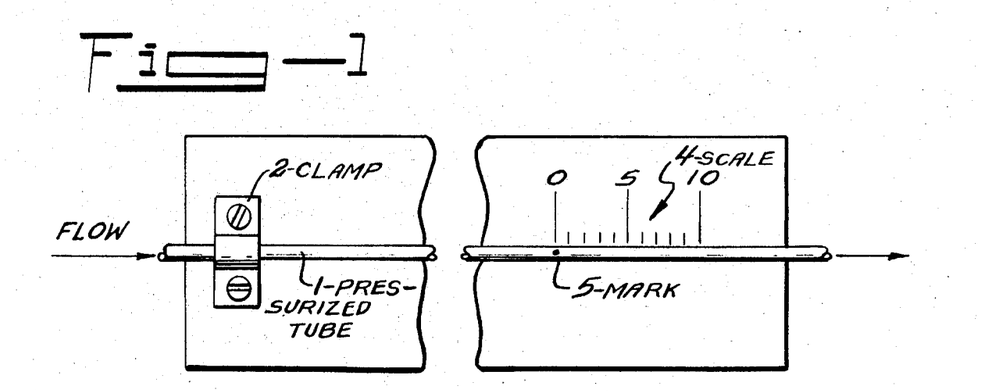
FIG. 1 shows a mechanical analog of the invention.

A mechanical analog of the pressure measuring concept is shown in FIG. 1 wherein a piece of pressurized tubing 1 is secured at one end, as by clamp 2, to a support plate 3, the material of plate 3 being the same as that from which tube 1 is made. A pressure measuring scale 4 is marked on plate 3 and a mark 5 is painted on the tube 1 at the zero or un-pressurized point on scale 4. As pressurized fluid is passed through tube 1, as indicated by the flow arrows, and by observing the position of the mark 5 with reference to the scale 4 one can theoritically read the elongation of the tube due to pressure therein. Calibration of the scale 4 in pounds per square inch would give a direct reading of the tube internal pressure. Additionally, making both tube 10 and plate 12 from the same material provides equal expansion of components due to temperature.

In applying the above concept to an actual transducer, an internal pressure of 10,000 psi causes a 10-inch long piece of 1/16 inch outside diameter stainless steel tube to elongate a few 1/1000ths of an inch. Replacing the marker and scale of the FIG. 1 setup with a linear displacement sensor and associated electronics, results in the generation of an output voltage proportional to displacements as small as millionths of an inch, the voltage output being converted by appropriate calibration to read pressure directly.

Figure 2:
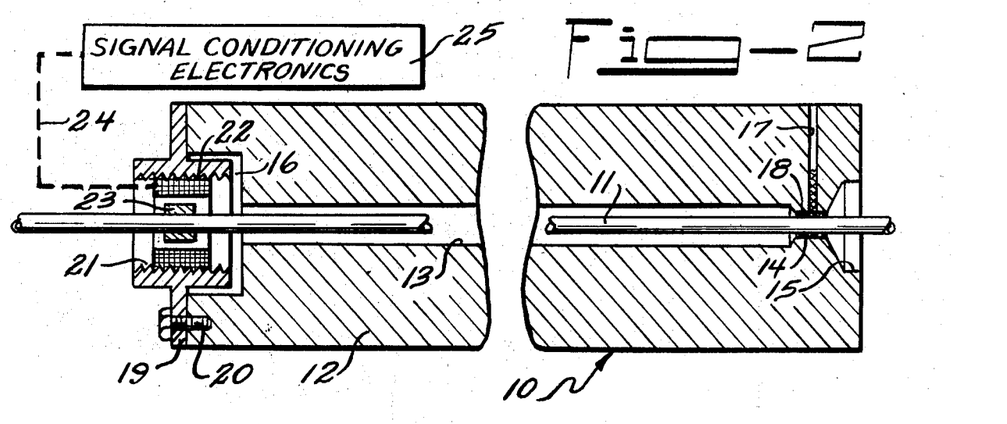
FIG. 2 is a cross-sectional view of an embodiment of the invention.

FIG. 2 illustrates an embodiment of an apparatus made in accordance with the invention mounted to monitor a fill line containing high pressure gas, the fill line being connected to a high pressure gas vessel, not shown. When the associated vessel is pressurized, the fill line lengthens under the influence of pressure. For example, it has been determined that the degree of elongation of a 1/16 inch outside diameter, 0.042 inch inside diameter fill line made of stainless steel is typically 2.5 mils per 10 inches at 20,000 psi, and the elongation is linear. However, this is a function of inside diameter, wall thickness, and the elastic properties of the fill line material, for instance.

Referring now to FIG. 2, the illustrated embodiment basically comprises a pressure measuring apparatus generally indicated at 10 operatively mounted on a high pressure fluid line, tube, or conduit 11 of material such as stainless steel, the line 11 being connected to a high pressure fluid vessel not shown and to a point of intended use, or to a dead end cover or coupling. Apparatus 10 comprises a yoke 12 of stainless steel, for example, or other material which is the same as the material of the gas line 11 for reasons described thereinafter. Yoke 12 is provided with a longitudinally extending central passageway or aperture having a first diameter section 13 extending along the major portion thereof, a reduced diameter section 14, an enlarged countersink section 15 at one end adjacent section 14, and a larger diameter countersink section 16 at the opposite end. Yoke 10 is provided with a passage or hole 17 extending from the outer surface thereof to section 14 of the central aperture which serves as a solder fill hole whereby the yoke 12 is soldered to line 11 at section 14 as indicated at 18, thereby fixedly securing the yoke and line together. However, yoke 12 can be fixedly attached to line 11 by other suitable means such as clamps, etc. A temperature compensator 19, constructed of aluminum, for example, extends into countersink section 16 of yoke 12 and is fixedly secured thereto by screws 20 (only one shown). Compensator 19 has a threaded central opening 21 within which a sensing coil 22 (consisting of primary and secondary windings) of a linear-variable-differential-transformer (LVDT) is adjustably positioned. A core 23 of the transformer, in the form of a ferromagnetic sleeve, is snugly fitted onto the conduit 11. It is thus seen that the sensing coil 22 of the differential transformer is adjusted along threads 21 to a desired point of the line with respect to the fixed point or solder connection 18. The linear differential transformer (coil 22 and core 23) is connected as indicated by a dash line 24 to signal conditioning electronics, indicated generaly at 25, to provide a high level output voltage or signal proportional to tube elongation. Linear-variable-differential-transformers are conventional in the art and constitute transducers which generate an a-c signal directly proportional to the displacement of its armature (core 23) from the electrical center of the transformer winding (coil 22). Since the details of the transformer do not constitute part of the invention, further description thereof is deemed unnecessary.

While the signal conditioning electronics 25 are state-of-the-art components and the details thereof do not constitute part of invention, it is broadly composed of five sub-sections, comprised of conventional passive electronic components and four (linear, integrated circuits, IC,) operational amplifiers.

A free-running R-C oscillator produces a 4 K Hz squarewave signal which is used to control a synchronous demodulator. It also provides the LVDT excitation signal after being passed through a linear, passive, adjustable phase, R-C filter network and an IC driver amplifier whose output is applied to the LVDT parallel-connected primary windings.

The series-connected LVDT secondary windings are connected in a bucking configuration, with the output signal being applied to an IC, differential input, amplifier.

With the LVDT core adjusted centrally between the two secondary windings, the voltage across each half of the secondary are equal in amplitude and 180° out of phase, resulting in a differential amplifier input of zero volts (in-phase component only).

Elongation of the tubing moves the core away from the null position, resulting in a linearly increasing input voltage. The amplifier output voltage is applied to a synchronous demodulator consisting of two complementary Field Effect Transistors (FET) switches and an IC amplifier.

The oscillator output controls the demodulator, resulting in a high level DC output voltage, proportional to the tubing elongation. The synchronous demodulator technique effectively rejects the quadrature (90-degree out of phase) component, of the signal, which is inherent in the LVDT output because of its inductive nature. The quadrature component carries no useful information and represents noise.

The electronics 25 are completely contained on a small (3 × 3 inches) printed circuit board.

In the above-described embodiment, temperature expansion effects on the line, tube, or conduit 11 are cancelled out because the yoke 12 is made of the same material as the tube and expands to the same extent.

The measuring apparatus 10 is also subject to temperature variations. In the above illustrated embodiment, these effects are compensated for by coupling the differential transformer to the tube reference position through the yoke plus the temperature compensator 19 made of a material of different expansion characteristics. The compensator 19 is appropriately dimensioned to produce a correction of appropriate magnitude and direction, and interposed between the reference point and the transformer via the yoke so that its expansion adds or subtracts from the sensing coil displacement, to produce a net zero displacement as a function of temperature variation.

In each of the embodiments illustrated in FIGS. 3–11, and described hereinafter, the linear-variable-differential-transformer (LVDT) thereof is electrically connected to signal conditioning electronics, not shown, of the type described above with respect to the FIG. 2 embodiment. Similar components of the FIGS. 3–11 embodiments will be given corresponding reference numerals.

Figure 3:
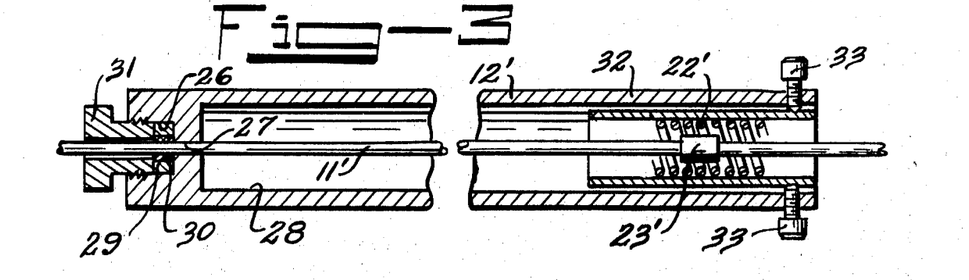
FIG. 3 is a cross-sectional view of another embodiment of the invention utilizng a collar-jam nut arrangement to secure the tube.

The embodiment illustrated in FIG. 3 comprises a tube or conduit 11' around which is positioned a yoke or block 12', tube 11' and yoke 12' being constructed of stainless steel, for example. Yoke 12' has a passageway or aperture extending longitudinally therethrough which comprises a first diameter section 26, a second but smaller diameter section 27, and a third and larger diameter section 28, tube 11' extending through each of said sections 26–28. A collar 29 is soldered, as indicated at 30, or otherwise secured, to tube 11' and located in passageway section 26 and is secured therein by a jam nut 31 which fits around tube 11' and is threadedly mounted in section 26, whereby tube 11' is fixedly secured to one end of yoke 12'. In the end of passageway section 28 opposite section 27, a temperature compensating sleeve 32 of aluminum or other suitable material is adjustably secured by set screws 33, sleeve 32 serving as a mount for the position sensing coils 22' of an LVDT, a core 23' of the LVDT being secured to tube 11'.

Mounting of the transformer sensor portion (coils 22') in the aluminum sleeve 32, attached to the stainless steel yoke 12' at the points of set screws 33, interposes a relatively greater thermal expansion section. This moves the sensor proportionally with temperature, providing an easily adjusted, intrinsic temperature compensator for the "real world" case of non-uniformly expanding materials.

Figure 4:
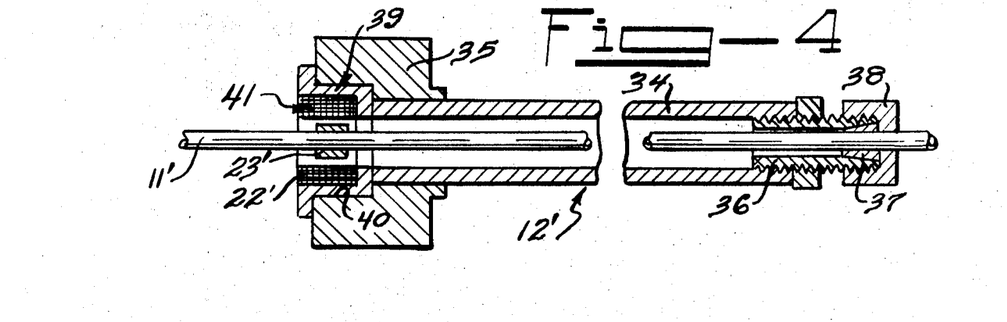
FIG. 4 is a cross-sectional view of another embodiment of the invention utilizing a compression type tube fitting for zero adjustment.

The embodiment illustrated in FIG. 4 is of a coaxial type comprising a tube or conduit 11', for example, of 1/16 inch O.D × 0.028 inch I.D stainless steel tubing, mounted within a yoke assembly 12" composed of a tube-like member 34 of ¼ inch O.D × 0.70 I.D stainless steel, for example, and a collar-like member 35 of stainless steel soldered or otherwise secured to tube-like member 34. Tube 11' is secured in yoke assembly 12" by a tube 36 coaxially threaded internally into tube-like member 34 and having a tapered internal end portion within which a tapered member 37 is compressed by a jam or compression nut 38 threadedly mounted on tube 36, thus providing a compression type tube fitting for zero adjustment. It is understood that elements 36–38 are of the same material as the tube 11' and yoke assembly 12', for example, stainless steel. A temperature compensating member 39 of aluminum, for example, is mounted in a countersink 40 in collar 35 and in abuttment with tube-like member 34, member 39 being provided with an aperture through which tube 11' passes. As in the embodiments of FIGS. 2 and 3, an LVDT assembly generally indicated at 41, comprising coils 22' and core 23', is mounted within temperature compensating member 39 with the core 23' being secured to tube 11' as above described.

The length of the FIG. 4 embodiment is 20 inches and was designed for a working pressure of 45,000 psia, rupture of this unit being well over 100,000 psia. The concept of linear elongation due to pressure, less Poisson ratio shortening, gave a linear displacement of approximately ½/1000 inch in a 20 inch gauge length to 20,000 psia.

Figure 5:
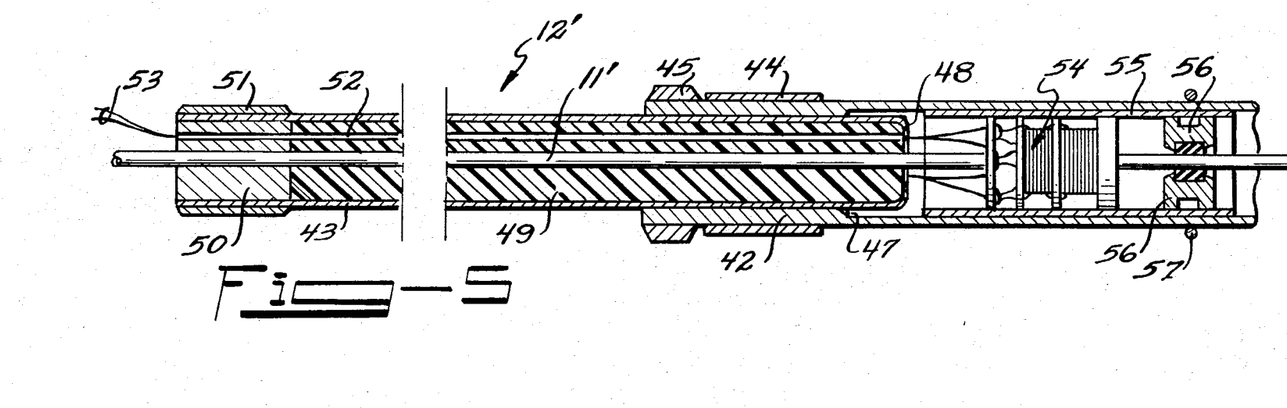
FIG. 5 is a cross-sectional view of another embodiment of the invention utilizing a plastic center-guide.
Figure 6:
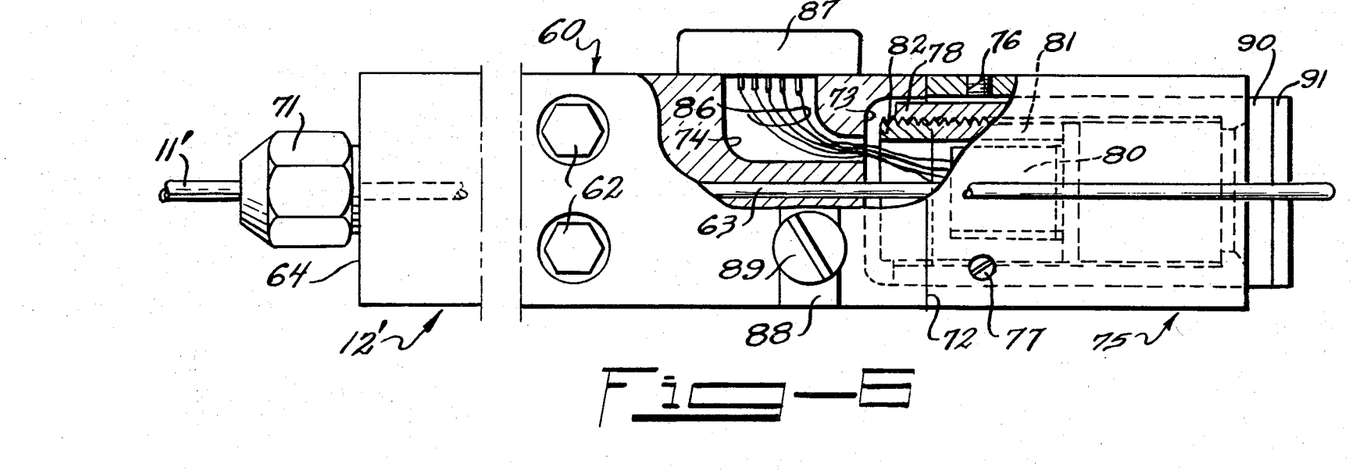
FIG. 6 is a partial, cross-sectional top view of another embodiment of the invention.
Figure 7:
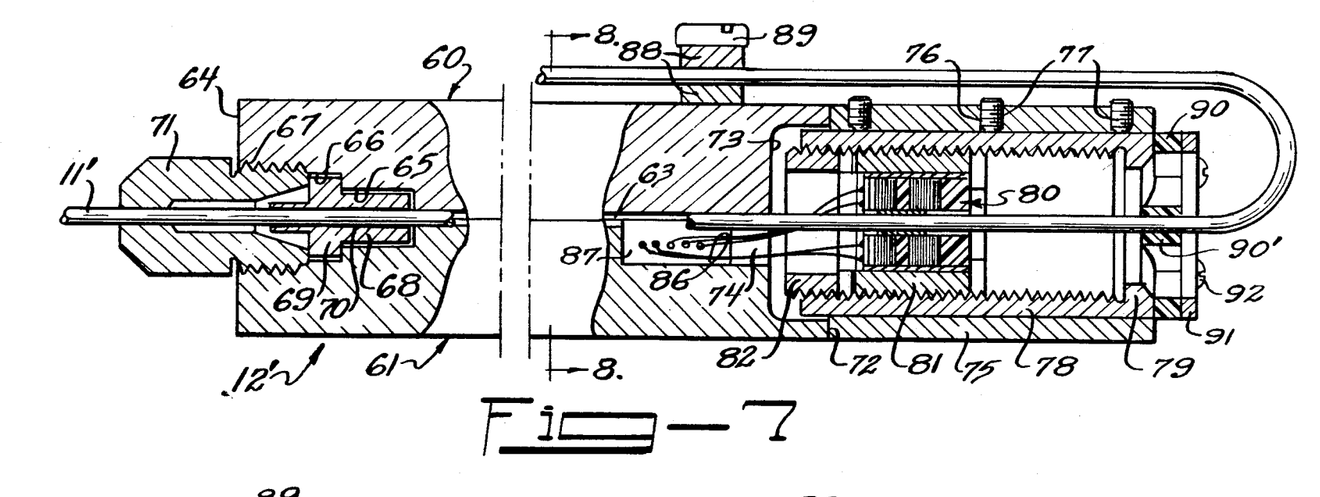
FIG. 7 is a side view of the FIG. 6 embodiment, partially in cross-section.
Figure 8:
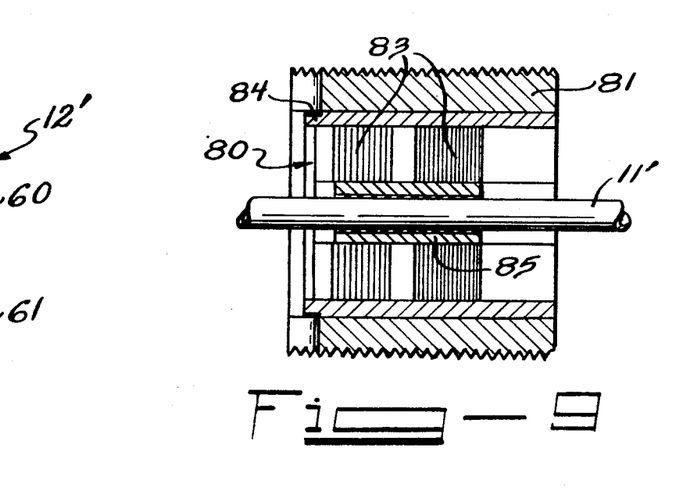
FIG. 8 is a cross-sectional view taken along the line 8—8 of FIG. 7.
Figure 9:
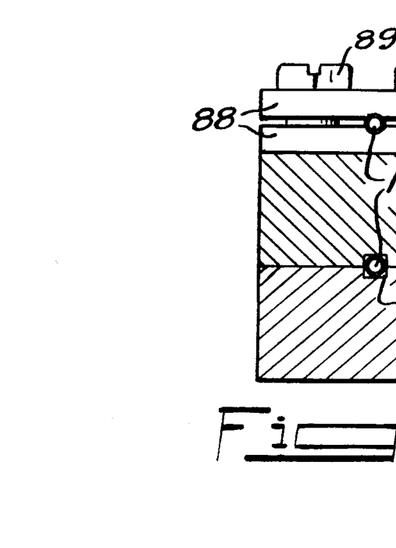
FIG. 9 is an enlarged view of the linear variable differential transformer of the FIG. 6 embodiment.

The FIG. 5 embodiment is a "pocket size" unit having a length of 6 inches in a coaxial tube arrangement. As illustrated this embodiment comprises a tube or conduit 11' of 1/16 O.D. stainless steel, for example, positioned within a yoke assembly 12'. Yoke assembly 12' is constructed of coaxial tubes 42 and 43 with tube 43 extending partially into tube 42 and secured therein by a strap type body clamp 44 which provides for zero adjustment and by a "decouple" tube clamp 45, which could be, if desired, combined with clamp 44. For example, elements 42-45 are constructed of stainless steel with tube 42 being ½ inch O.D × ⅜ inch I.D. × 3.0 inches machined to 7/16 inch I.D for 2 inches defining a shoulder 47, and tube 43 being ⅜ inch O.D × 0.035 inch wall. Tube 43 is swaged at one end as indicated at 48 to contain a center guide 49 made, for example, of a plastic composed of about 70 percent Ekonol (Carborundum Corporation), 10 percent copper flake, and 20 percent Teflon (TFE). A base or end plug 50 of stainless steel, for example, abuts center guide 49 at the end opposite swage 48 and is retained in tube 43 by a strap clamp 51, also of stainless steel. Tube 11' extends through central apertures or bores in center guide 49 and base 50. Three wire passages or grooves 52 (only one shown) are cut in center guide 49 and base 50, each to handle two wires 53 extending from an LVDT generally indicated at 54 and constructed as above described with a ferrite core secured to tube 11', such as by epoxy, and appropriate coils or windings mounted within a temperature compensating sleeve 55 of, for example, ⅜ inch I.D × 7/16 inch O.D × 1.5 inch aluminum secured in the 7/16 inch I.D portion of tube 42. A backup ring and assembly generally indicated at 56, and constructed of stainless steel, for example, is positioned within sleeve 55, through which tube 11' freely passes, assembly 56 being retained within sleeve 55 by a wire temperature compensation clamp 57 which allows for temperature compensation adjustment.

The embodiment illustrated in FIGS. 6-9 comprises a high pressure tube or conduit 11' mounted within a yoke assembly 12', tube 11' and yoke assembly 12' being constructed, for example, of stainless steel, with the tube having a 0.063 O.D × 0.042 I.D. Yoke assembly 12' is composed of two sections 60 and 61 (see FIG. 8) secured to one another by a plurality of bolts or screws 62, each section 60 and 61 being provided with matching grooves which form a passageway 63 for tube 11'. Yoke assembly 12' is provided at one end, indicated at 64, with a countersink of varying diameter sections indicated at 65, 66 and 67, section 67 being threaded. A ferrule 68 having a flange portion 69 is positioned in counterbore sections 65 and 66 and is brazed, as indicated at 70, or otherwise secured to tube 11'. A tube position lock nut 71 is threaded into counterbore section 67 and abuts the flange 69 of ferrule 68 locking same in position against the yoke 12'. For example, ferrule 68 and lock nut 71 are constructed of stainless steel. Yoke assembly 12' is provided at the opposite end, indicated at 72, with a counterbore 73, a channel or opening 74 extending from the counterbore to the side of the yoke assembly. Secured to end 72 of yoke assembly 12' is a temperature compensator holder 75, of stainless steel, for example, having a plurality of threaded apertures 76 through which set screws 77 (only one shown) are selectively inserted to adjustably retain a hollow internally threaded temperature compensator 78 which is provided at one end with an inwardly extending flange or stop 79. An LVDT, generally indicated at 80 is secured as by epoxy in an LVDT chuck 81 which is adjustably mounted within temperature compensator 78 via the internal threads thereof and is retained within the compensator 78 by a jam nut 82, temperature compensator 78 and jam nut 82 being constructed of aluminum, for example, while chuck 81 is made of stainless steel. The details of LVDT 80 are more clearly illustrated in FIG. 9 and comprise coils or windings 83 mounted within a casing 84 and surrounding a core 85. Core 85 is secured to tube 11' by epoxy, for example, while casing 84 is similarly secured to LVDT chuck 81, whereby the coils or winding are movable with respect to core 85 as previously described with respect to the FIG. 2 embodiment. LVDT 80 is electrically connected to signal conditioning electronics, not shown, but similar to the above-described, via wires 86 which extend through channel 74 into a connector 87 mounted on yoke 12'. In this embodiment, tube 11' is bent back over yoke 12' and is fixedly secured thereto by a tube block 88 of aluminum, for example, which is secured to yoke 12' by screws 89, which provides a "de-coupling" effect to isolate forces applied to the tube externally, from adding or subtracting to the forces generated by the internal fluid pressure. A tube guide 90, of Teflon, for example, having a central portion 90' positioned about tube 11' is secured by a retainer 91, of stainless steel, for example, via screws 92 to temperature compensator element 78, which function to maintain alignment of tube 11' within yoke 12' as well as providing temperature compensation.

The embodiment of FIGS. 6–9 provides for infinitely variable temperature compensation; a fixed, non-adjustable zero, ruggedized construction, and the pressure range has been reduced to 20,000 psia with an overall length of about 12 inches, as compared, for example, with the FIG. 4 embodiment.

In tests conducted utilizing the inventive measuring apparatus, it was illustrated that pressures from a few atmospheres to over 100,000 psi can be measured. Thus, the above-described pressure measuring apparatus has the following advantages:

1. The apparatus is automatically temperature compensated by use of a metal with the same coefficient of thermal expansion for the yoke as in the line or tube being measured;

2. The apparatus takes very little space;

3. No welding or other deformation of the line or tube is required. However, two or three small diameter shock de-coupling loops may be required to ruggedize the line.

4. The gas line or tube system contains no voids or dead volume; and

5. The pressure ranges can be varied by changing inside diameter, wall thickness, and/or tubing material.

6. "Low pressure" transducers can sustain very high overpressures without deformation or damage.

Also, as pointed out above, in addition the inventive pressure measuring apparatus may be used as a gauge with a linear dead end gas line which communicates with the interior of a pressure vessel, or used for monitoring pressures in closed vessels or large diameter pipes by using the apparatus to monitor elongation of a hoop strain collector comprising a coil of wire or other suitable material wrapped around the periphery of the pressure vessel or pipe.

Figure 10:
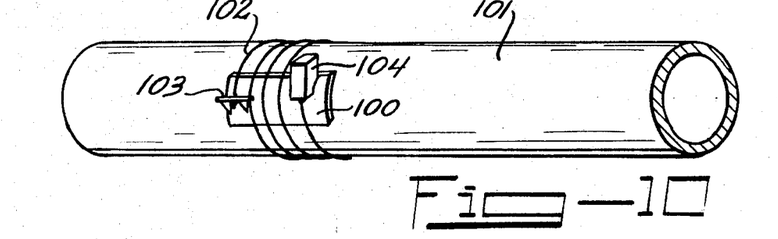
FIG. 10 illustrates a general layout of an embodiment of the invention for large diameter pipes utilizing wire loops therearound.
Figure 11:
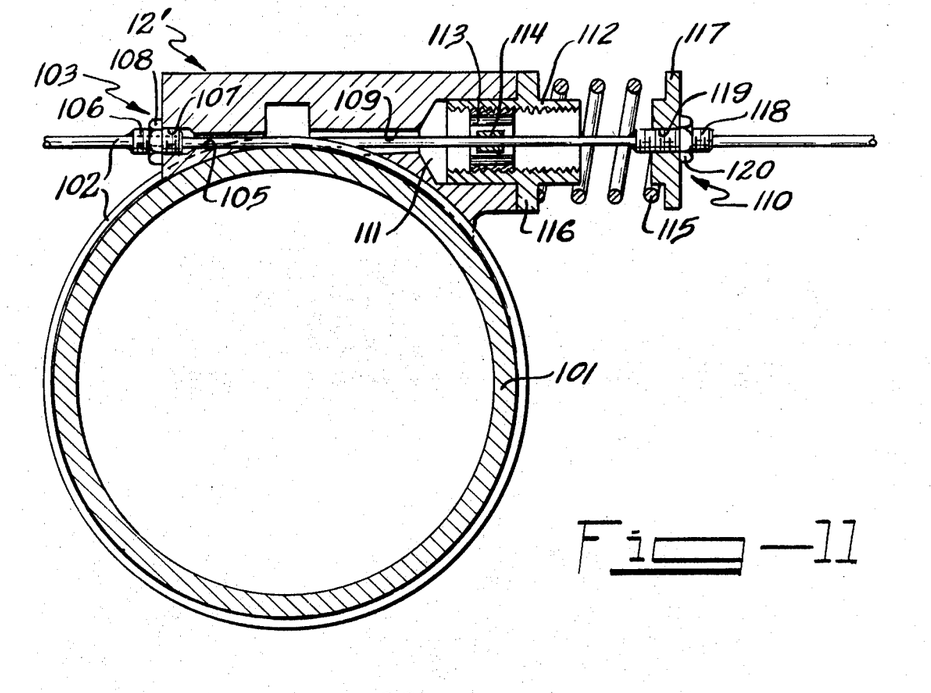
FIG. 11 is an enlarged cross-sectional view of an embodiment of the invention illustrated in FIG. 10 for large pipes.

FIGS. 10 and 11 illustrate an application of the invention to a pressure vessel or to large diameter piping, tubing, or conduits and utilizes hoop strain as the indicating parameter. As shown, generally in FIG. 10, a base plate 100 is bonded to a large diameter pipe or conduit 101, plate 100 being of the same material as the pipe. A plurality of wire loops 102 which function as a hoop strain collector extend around pipe 101 and are secured at one end to an adjustable anchor 103 used to "zero" the system, and at the other end to an LVDT holder or yoke assembly 104, similar to the yoke assemblies of the FIGS. 2–6 embodiments, and will be described in detail with respect to FIG. 11. The wire loops 102 are for mechanical gain and may be of a round, flat or square cross-section, for example. The surface of the pipe 101 is treated to reduce "sticktion" friction between the wire loops 102 and the surface such as with thin sheets of nylon or teflon, or by copper coating. Tubing loops may be used instead of wire, where another pressure reference is desired, the pressure being simply applied and contained within the tube that is used as the loop gauge, and the LVDT senses the differential effect.

Referring now to FIG. 11 a hoop strain collector 102 (wire or tube loops) extends around pipe 101 and passes through a passage 105 in one end of a yoke assembly 12' and is attached thereto via the adjustable anchor 103 comprising an adjusting collar 106 solder to strain collector 102 and retained in a countersink 107 in yoke assembly 12' with a "zero position" nut 108 threadedly mounted thereon for adjusting the strain collector. The other end of the hoop strain collector 102 passes through a passage 109 in yoke assembly 12' and is secured via a restore/pre-load assembly generally indicated at 110. Yoke assembly 12' is provided with a countersink or cavity 111 within which a temperature compensator 112 is secured as above described with an LVDT coil or windings 113 adjustably mounted with compensator 112 and an LVDT core 114 secured to the hoop strain collector 102. The restore/pre-load assembly 110 comprises a spring 115 positioned between a flange 116 on compensator 112 and a retainer member 117 with strain collector 102 secured as by soldering to a threaded collar 118 movably positioned in an aperture 119 in retainer member 116 and adjustably secured therein by a tension adjusting nut 120 which functions to adjust the tension on spring 115 and the force on hoop strain collector 102.

The hoop strain collector 102 can be internally pressurized tubing, allowing measurement of the linear elongation under pressure with respect to the pipe 101 which now in effect constitutes a circular yoke assembly. If such a yoke assembly is a pressure vessel, it can be also pressurized to give yoke-to-hoop pressure system differential readout, or if the hoop is not pressurized, you will see the yoke internal pressure.

Figure 12:
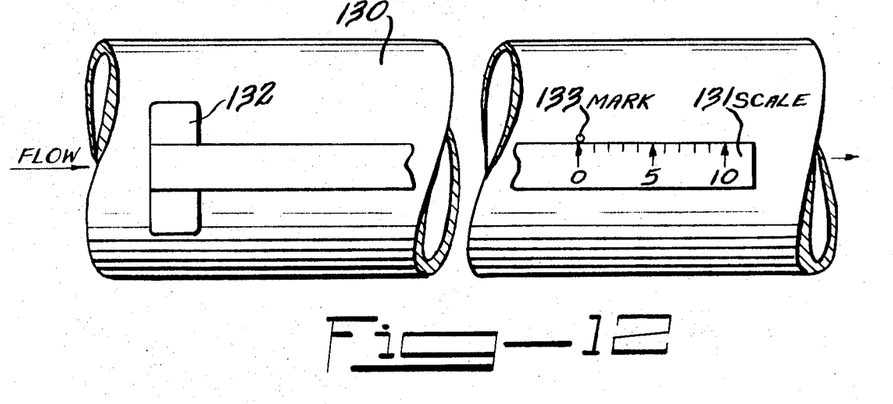
FIG. 12 illustrates the inventive concept applied to a large diameter pipe as a visual measuring gauge.

FIG. 12 illustrates a visual gauge or measuring tool utilizing the inventive concept for measuring fluid pressure in large pipes as a function of the elongation of the pipe due to the fluid pressure therein. The illustrated embodiment comprises a pipe 130 having fluid flowing therethrough, as indicated by the flow arrows, a scale 131 is fixedly secured at one end to pipe 130 by bonding, clamping or otherwise as indicated at 32 and extends along the longitudinally axis of pipe 130. A mark is permanently made on pipe 130, as indicated at 133, at the zero point on the scale 131. Flow of fluid, in either direction, through pipe 130 causes elongation of the pipe and thus movement of the attached scale 131 with respect to mark 133 whereby visual readings can be taken, if sufficient length of pipe is used with respect to pressure, diameter and wall thickness.

It is easily seen as in the analog of FIG. 1 and its conversion to electronic signals, that the mark 133, could be the core of an LVDT, for example. Further the scale 131 can be the mount for a transformer of an LVDT, for example, and a corresponding shortening of length for mounting 131 may be achieved. The LVDT of course may be replaced by a linear potentiometer for example, or other suitable electronic, electro-optical, or optical transducing means.

It has thus been shown that the present invention provides a method and apparatus for measuring the static or dynamic pressure in fluid lines or vessels by monitoring the linear elongation of the lines as a function of the fluid pressure therein.

While particular embodiments of the invention have been illustrated and described, modifications will become apparent to those skilled in the art, and it is intended to cover in the appended claims all such modifications as come within the spirit and scope of the invention.

What we claim is:

1. A method for measuring pressures in fluid lines without tapping, restricting, or modifying the interior of the lines or fluid therein comprising the steps of: providing a fluid line with means for determining the elongation of the fluid line resulting from fluid pressure therein, monitoring the linear elongation of the fluid line, and translating the elongation of the fluid line into a pressure reading.

2. The method defined in claim 1, wherein the step of providing a fluid line with elongation determining means is accomplished by attaching to an external surface of the fluid line a member having the same coefficient of thermal expansion as the fluid line, and positioning on the fluid line in spaced relation with the point of attachment of the member and the fluid line means for detecting linear differential elongation.

3. An apparatus for measuring pressures in fluid lines by monitoring elongation of such fluid lines without tapping, restricting, or modifying the interior of the lines or fluid therein comprising: yoke-like means constructed of material having the same coefficient of thermal expansion as an associated pressure fluid line to be measured, said yoke-like means being provided with a longitudinally extending central aperture, means adapted for fixedly securing said yoke-like means to an external surface of such an associated fluid line located in said central aperture, temperature compensating means operatively connected to said yoke-like means, linear variable differential transformer means operatively positioned within said temperature compensating means having a portion thereof adapted to being connected to such an associated fluid line for measuring elongation of such an associated fluid line, and means operatively connected to said transformer means for producing output signals proportional to elongation of such an associated fluid line.

4. The apparatus defined in claim 3, wherein said central aperture of said yoke-like means includes a reduced diameter portion in one end portion thereof and an enlarged diameter section in an opposite end portion thereof, said temperature compensating means being at least partially located within said enlarged diameter section of said central aperture, and said yoke-like means being adapted to be fixedly secured to such an associated fluid line at said reduced diameter portion of said aperture.

5. The apparatus defined in claim 4, wherein said yoke-like means is provided with at least one passageway extending from the exterior thereof to said central aperture at said reduced diameter portion, wherein said means adapted for fixedly securing said yoke-like means to such an associated fluid line comprises a solder connection, said passageway functioning as a solder fill hole.

6. The apparatus defined in claim 3, wherein said linear differential transformer means comprises a coil means adjustably positioned in said temperature compensating means, and a core means adapted to be fitted onto such an associated fluid line.

7. The apparatus defined in claim 6, wherein said core means comprises a ferromagnetic sleeve.

8. The apparatus defined in claim 6, wherein said temperature compensating means includes a threaded central opening, and wherein said coil means is threadedly mounted in said threaded central opening.

9. The apparatus defined in claim 3, wherein said yoke-like means is constructed of stainless steel, and said temperature compensating means is constructed of aluminum.

10. The apparatus defined in claim 3, wherein said means for fixedly securing said yoke-like means to an associated fluid line comprises a collar-like means secured to such an associated fluid line, and nut-like means for retaining said collar-like means.

11. The apparatus defined in claim 3, wherein said temperature compensating means is adjustably mounted to said yoke-like means.

12. The apparatus defined in claim 3, wherein said means for fixedly securing said yoke-like means to an associated fluid line comprises means for providing zero adjustment of said linear variable differential transformer means.

13. The apparatus defined in claim 3, wherein said yoke-like means comprises a plurality of coaxial tube-like members and means for fixedly securing said member to one another.

14. The apparatus defined in claim 3, wherein said temperature compensating means is adjustably mounted with respect to said yoke-like means, wherein said linear variable differential transformer is mounted in a chuck means, and wherein said chuck means is adjustably mounted within said temperature compensating means.

15. The apparatus defined in claim 3, additionally including a restore/pre-load assembly operatively connected to an associated fluid line extending from said yoke-like means.

* * * * *